E. RIPLEY.
Culinary Vessel.
No. 41,095.
Patented Jan. 5, 1864.
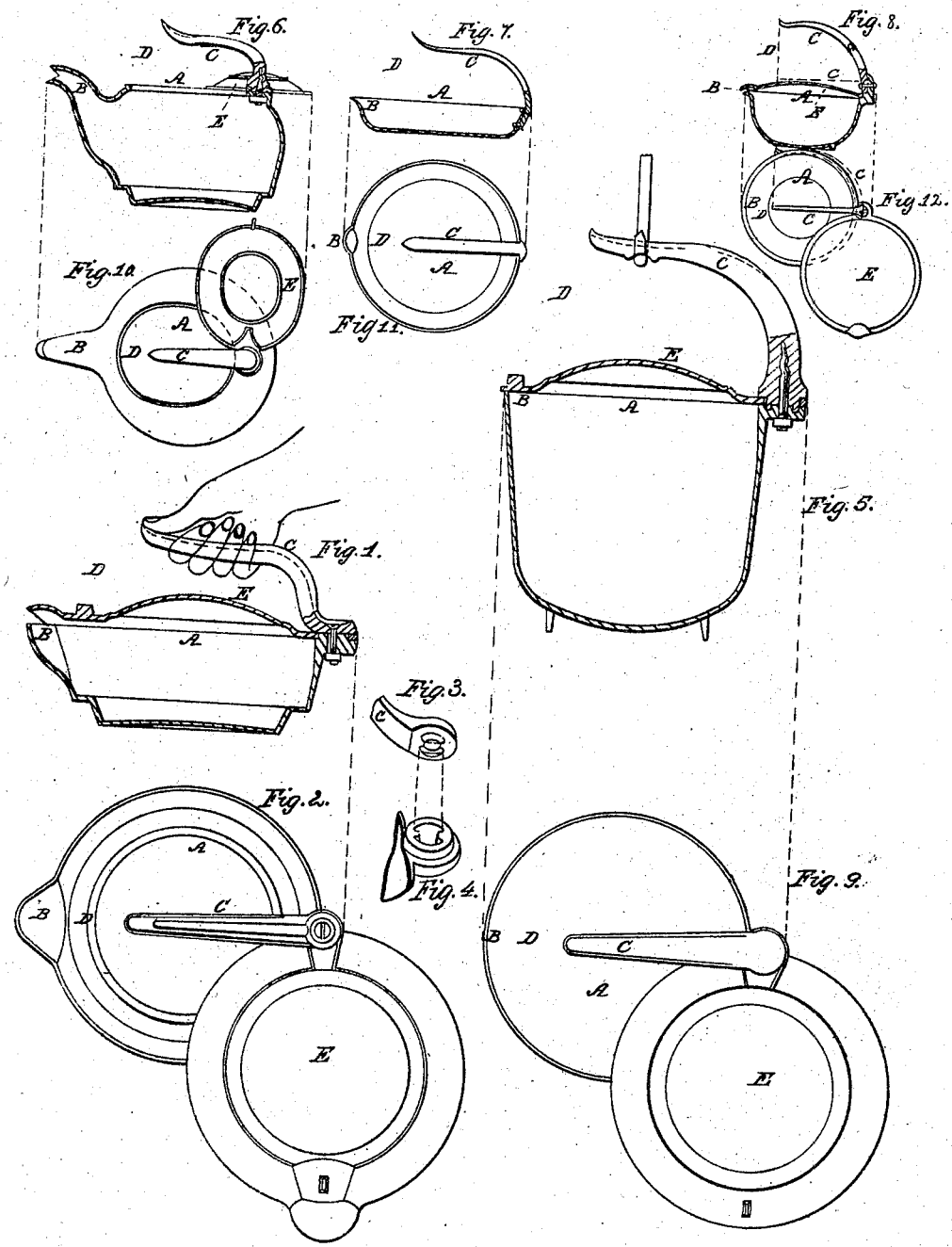

UNITED STATES PATENT OFFICE.

EZRA RIPLEY, OF TROY, NEW YORK.

IMPROVEMENT IN CULINARY VESSELS.

Specification forming part of Letters Patent No. 41,095, dated January 5, 1864.

*To all whom it may concern:*

Be it known that I, EZRA RIPLEY, of the city of Troy, in the county of Rensselaer and State of New York, have invented a new and useful Improvement in Culinary Vessels, of which the following is a full and exact description, reference being had to the annexed drawings, in which—

Figure 1 is a central sectional elevation, Fig. 2 a plan, and Figs. 3 and 4 views of parts, of a culinary vessel having my said invention embodied therein. Figs. 5, 6, 7, and 8 are central sectional elevations; and Figs. 9, 10, 11, and 12 top views of four other forms of culinary vessels, each embodying my said improvement, like parts being marked by the same letters in all the figures.

This invention consists in providing such culinary vessels as have an opening, A, in the top to pour into, and a spout, lip, or suitable part, B, at one side to pour out of, with a lifting-handle, C, extended from that side of the vessel which is opposite to the pouring-out place, over the middle portion of the vessel, but not across from side to side thereof, so that the vessel can hang level and be lifted and carried about by letting the said handle simply rest or hang in the hand of the person using the vessel, the same as an ordinary kettle can hang level and be lifted and carried about by its bail simply resting or hanging in the hand of the user, and so that there shall be, in addition to the pouring-in spaces each side of the lifting-handle, an unobstructed pouring-in space, D, between the free end of the handle and the opposite side of the rim of the vessel, thus making the vessel much more convenient to pour into and fill up when held hanging in the hand than if the vessel had a bail, like a common kettle, which advantage is of considerable practical importance, especially in culinary vessels like tea-kettles; Figs. 6 and 10 having a comparatively small top opening, A, to pour into, and so that the lifting-handle C shall be opposite to and extend toward the spout, lip, or pouring-edge B, to make the vessel the most convenient to pour out of when held up by its handle, without in any way obstructing the spout, lip, or pouring-out place, or even requiring the latter to be covered over; whereas, if the vessel had a bail extended across from side to side toward the pouring-out place, then the spout, lip, or pouring-edge would be obstructed by one end of the bail or its holding-lug, or would require to be bridged or covered over to furnish a holder for the end of the bail.

I thus secure by my said improvement the advantage of greater convenience and ease in lifting and carrying about which a culinary vessel with a bail has over one with a handle extended in either a vertical, horizontal, inclined, or curved direction outward, and also the advantage over a vessel with a bail of having at all times an unobstructed pouring-in space, D, and also just as large, free, and open or uncovered a pouring-out place, B, as shall be desirable, all right opposite to or in line with the lifting-handle when in use.

I construct my improved culinary vessel in any of the known forms, and either with or without a horizontally-swinging cover, E, and secure the lifting-handle to the body of the vessel by any of the various devices shown in the annexed drawings, or by other suitable means, in some cases fixing the handle rigidly in its standing position, and in others so that it can be turned down toward or against the rim of the vessel, an example of the latter mode being shown by Figs. 8 and 12.

What I claim as new and of my invention, and desire to secure by Letters Patent, is—

A culinary vessel having an opening, A, in its top to pour into, a spout, lip, or pouring-out place, B, at one side, and on the opposite side a lifting-handle, C, extended over the middle portion of the vessel, but not across from side to side thereof, substantially as herein described.

EZRA RIPLEY.

Witnesses:
N. S. VEDDER,
AUSTIN F. PARK.